United States Patent
Meinunger

[15] 3,680,455
[45] Aug. 1, 1972

[54] PHOTOGRAPHIC CAMERA
[72] Inventor: Helmut Meinunger, Radevormwald, Germany
[73] Assignee: Kurbi & Niggeloh, Radevormwald, Germany
[22] Filed: June 5, 1970
[21] Appl. No.: 43,766

[30] Foreign Application Priority Data
June 6, 1969 Germany............P 19 28 785.5

[52] U.S. Cl. .................................................95/11
[51] Int. Cl. ..........................................G03b 19/00
[58] Field of Search.........................................95/11

[56] References Cited
UNITED STATES PATENTS
2,390,932 12/1945 Fitz................................95/11
3,256,793 6/1966 Denk et al. ....................95/11
1,814,973 7/1931 Silva..........................95/11 UX
2,495,223 1/1950 Bodlander ......................95/11
3,244,072 4/1966 Dowling et al. ............95/18 UX Primary Examiner—Samuel S. Matthews
Assistant Examiner—Richard M. Sheen
Attorney—Millen, Raptes & White

[57] ABSTRACT

A camera having telescoping housings at right angles to the lens axis. One housing comprises essentially all of the elements of the camera whereas the second housing contains the viewfinder. The housings can be locked into an open or closed position, and provision is made for a flashbulb holder operable only at a predetermined shutter speed.

7 Claims, 4 Drawing Figures

PATENTED AUG 1 1972

3,680,455

INVENTOR
HELMUT MEINUNGER

BY *Millen, Raptes & White*
ATTORNEYS

PHOTOGRAPHIC CAMERA

This invention relates to a novel photographic camera. More particularly, it relates to a compact camera construction having two sections which are adapted to be telescoped within each other at right angles to the optical axis.

In conventional cameras of the type this invention deals with, the viewfinder is fixedly connected with other elements of the camera essential for photography, for example, the one disclosed in German Pat. No. 698,952. A disadvantage of that type of camera is the fact that the camera must be larger by the size of the viewfinder window, even in the closed position, than would be required by the remaining elements essential to carry out the picture-taking procedure.

An object of this invention is to provide a novel camera of compact construction which overcomes the disadvantage of requiring an enlargement of the size of the camera to incorporate the viewfinder.

Another object of this invention is to provide a novel compact camera constructed of two housing sections adapted to be telescoped within each other, wherein one housing comprises the essential photographic elements and the second housing contains the viewfinder.

Another object of this invention is to provide a novel compact camera constructed of two telescoping housing sections having a simple locking arrangement when the sections are in an open position.

According to this invention, a camera is provided of compact construction wherein two housings are capable of being telescoped together at right angles to the lens axis. One housing contains essentially all the elements of the camera whereas the second housing contains the viewfinder. A simple locking mechanism is provided for locking the telescoping housings in the closed and open positions. In the closed position, the lens and viewfinder are covered, and the second housing serves as a protective casing for the camera elements.

Another aspect of the camera is the dual functionality of a flashbulb holder which serves as a locking member when the camera is open. Furthermore, the flashbulb holder is keyed to the shutter speed to permit insertion of a flashbulb only at a shutter speed suitable for picture taking with flash. Accordingly, the shutter setting (or diaphragm opening) operates as a safeguard against taking pictures at the wrong shutter speed with flashbulbs.

Another aspect of the camera is the dual functionality of the shutter release lever which may also function as a locking latch for the two housings when the camera is closed.

Upon further study of the specification, drawings, and claims, other objects and advantages of the present invention will become apparent, particularly from the following detailed description of an embodiment of the invention as illustrated in the accompanying drawing wherein:

Figure 2:
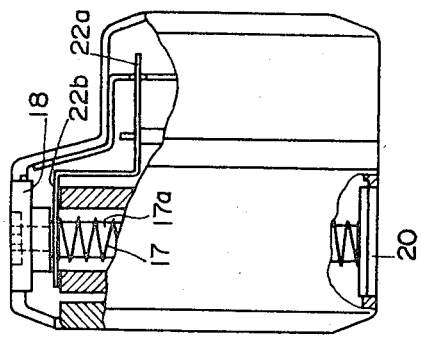
FIG. 2 is an end view of the camera in the open position of FIG. 1 and partially broken away.

Referring to the drawing, the camera of the present invention comprises a housing section 10 which contains all of the elements essential for taking a photograph, such as a lens 12, a film advance unit 13, a shutter (not shown), a shutter release device 14, and the like. A housing section 15 is provided which telescopes into housing 10 at right angles to the axis of the lens 12 and contains a viewfinder 16 and a peepsight 16a. In the closed or telescoped position of the housing sections 10 and 15, the peepsight 16a and the lens 12 are covered. When the housing sections 10 and 15 are pulled apart to the open position, the peepsight 16a of viewfinder 16 and the lens 12 are uncovered.

During the opening procedure, a holder 18 for a flashbulb and the like locks into position on the upper side between the edges 10a and 15a of the respective housing sections under the force of a spring 17 mounted on a rod member 17a. The holder 18 is connected to a resilient member 19 connected to an inner part of the housing section 15. The resilient member 19 can consist, similarly as both housing sections, preferably of an injection-molded synthetic resin material. A spacer member 20 is also provided, corresponding to the open space between the open housing sections on the bottom of the camera. Member 20 is attached to a resilient member 21 connected to an inner part of housing 15 and simultaneously locks, similarly as holder 18, under the effect of the spring 17 when the sections are opened.

Above the lens 12, there is a shutter speed indicator 22 and an adjusting lever 22a for setting the desired shutter speed. As shown, two speeds are provided in the embodiment, however, additional speed settings can be used. The adjusting lever serves a dual purpose, i.e., for setting the desired shutter speed, and also for securing the flashbulb holder when the shutter speed is correctly set for taking a picture with a flashbulb. Thus, when the shutter speed is set at 1/90 of a second, the holder 18 can move downwardly against the force of the spring. Accordingly, it is not possible to insert a flashbulb and the camera user is alerted that the camera shutter speed is set for picture taking without a flashbulb.

In order to take pictures with a flashbulb, one must shift the lever 22a to the 1/30 of a second position, and by doing so, the offset portion 22b of lever 22a is moved under the holder 18. The holder is thus secured against downward movement, and a flashbulb can be inserted. However, in this position it is not possible to close the camera, and the lever 22a must be moved away from the 1/30 position to permit the holder 18 to be moved down against the spring 17, while at the same time moving spacer 20 upwardly against the spring to permit closing of the camera.

Figure 4:
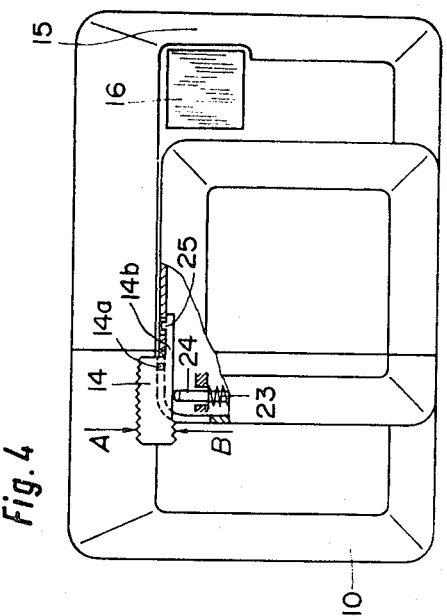
FIG. 4 is a front view of the camera in the closed position.
Figure 1:
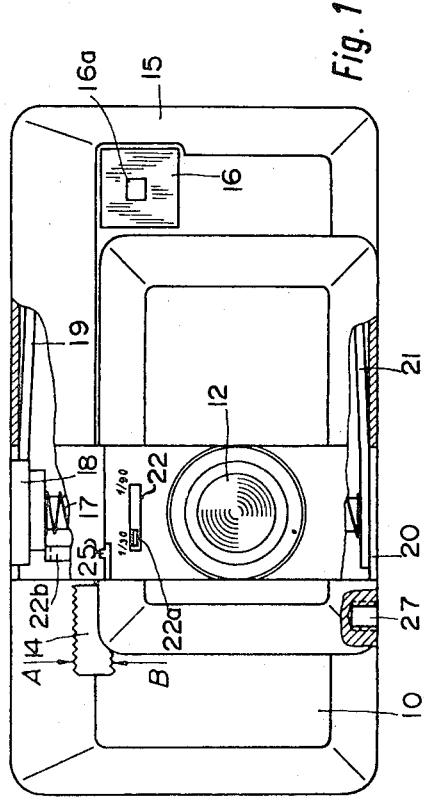
FIG. 1 shows a front view of the camera of this invention in the open or picture taking position.
Figure 3:
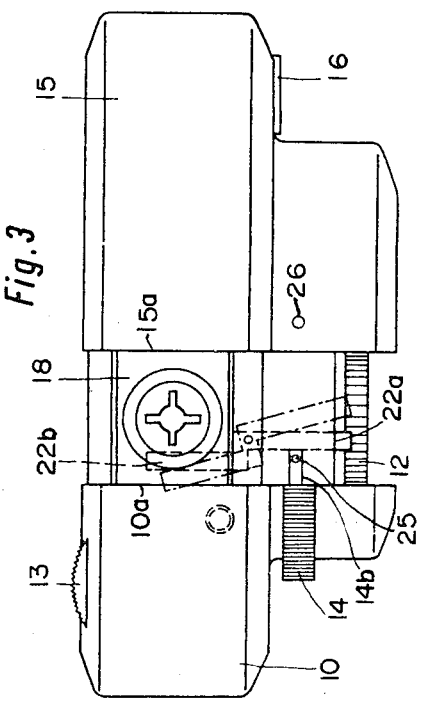
FIG. 3 is a top view of the camera in the open position of FIG. 1.

The shutter release lever 14 is pivoted about a pin 14a (FIG. 4) and serves a dual function. When the lever is depressed in the direction of arrow A, it actuates a release button 24 which is movable downwardly against spring 23, and thereby triggers the shutter. Additionally, the lever 14 is provided on an extension 14b thereof with a lug 25 adapted to fit into a hole 26 of housing 15 when the two housings are closed, thus securing the housings together. By moving the lever 14 in the direction of arrow B, the lug 25 is displaced from hole 26, thus permitting the two housings to be pulled apart.

The film advance wheel 13 extends out of housing 10 permitting advancement of the film. Other conventional elements can be provided on the camera, such as a screw thread 27. Since the lens of the camera is covered when the camera is closed, and the housings are made from an impact-resistant synthetic resin material, no carrying case is necessary. If a carrying strap is desired, the housing sections can be provided with an appropriate strap holder.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A photographic camera comprising a first housing section containing a lens and other essential photographic elements and a second housing section containing a viewfinder; said first housing section having top and bottom edge portions, said second housing section being telescopically slidably mounted over said first housing section and having top and bottom edge portions opposed said top and bottom edge portions of said first housing section, said second housing section being slidable at right angles to the optical axis of said lens between a closed position wherein said opposed top and bottom edge portions of said housings are in mating engagement and said lens and viewfinder are covered and an open position wherein said opposed top and bottom edge portions of said housings are spaced apart and said lens and viewfinder are exposed; a locking member movably mounted within said housing sections and movable to a position between the spaced top edge portions of said housing sections only when said second housing section is in the open position to lock said housing sections in the open position; and resilient means secured to said locking member for moving said locking member to a position between the spaced top edge portions of said housing sections upon sliding of said second housing section to the open position.

2. The camera of claim 1 including a second locking member movably mounted within said housing sections and movable to a position between the spaced bottom edge portions of said housing sections, and resilient means secured to said second locking member for moving said second locking member to a position between the said spaced bottom edge portions of said housing sections upon sliding of said second housing section to the open position.

3. The camera of claim 1 wherein said locking member is a flashbulb holder.

4. The camera of claim 3 wherein said flashbulb holder is locked into position by lever means connected to a shutter speed indicator on said first housing section.

5. The camera of claim 4 wherein the shutter speed of said camera is adjusted by said lever means.

6. The camera of claim 1 wherein a shutter release on said first housing section contains latch means to secure said second housing section in the closed position.

7 The camera of claim 1 wherein said resilient means comprises spring biased means.

* * * * *